(12) United States Patent
Herbst

(10) Patent No.: US 6,471,505 B1
(45) Date of Patent: Oct. 29, 2002

(54) HANDLING SYSTEM FOR A PLASTIC MATERIAL INJECTION MOLDING MACHINE

(75) Inventor: Richard Herbst, Eching (DE)

(73) Assignee: Hekuma Herbst Maschinenbau GmbH, Eching (DE)

( * ) Notice: Subject to any disclaimer, the term of this patent is extended or adjusted under 35 U.S.C. 154(b) by 0 days.

(21) Appl. No.: 09/687,475

(22) Filed: Oct. 13, 2000

(30) Foreign Application Priority Data

Oct. 14, 1999 (DE) .......................................... 199 49 566
Dec. 30, 1999 (DE) .......................................... 199 63 843

(51) Int. Cl.$^7$ .............................................. B29C 45/40
(52) U.S. Cl. .................... 425/556; 425/444; 425/DIG. 5
(58) Field of Search ................................ 425/556, 572, 425/444, DIG. 5

(56) References Cited

U.S. PATENT DOCUMENTS 3,804,568 A    4/1974  Rees
4,721,452 A  *  1/1988  Delfer, III .................. 425/556

FOREIGN PATENT DOCUMENTS

| DE | 37 26 653 | 2/1989 |
| DE | 94 19 474 | 2/1995 |
| DE | 196 53 778 | 6/1998 |
| EP | 0 718 084 A2 | 6/1996 |

* cited by examiner

*Primary Examiner*—Tim Heitbrink
(74) *Attorney, Agent, or Firm*—Knobbe Martens Olson & Bear LLP

(57) ABSTRACT

A handling system for a plastic material injection molding machine comprises an arm for unloading plastic material articles from hollow cavities of a mold of the plastic material injection molding machine. The hollow cavities are arranged in a first plane and the arm essentially moves within the first plane. A conveyor system moves within a second plane for transporting away the plastic material articles. A transfer station is arranged between the mold and the conveyor system for transferring the unloaded plastic material articles from the first plane to the second plane. The transfer station comprises a transfer plate for the plastic material articles and is adapted to be moved along a predetermined trajectory from a first operational position within the first plane into a second operational position within the second plane. The trajectory extends essentially outside the first plane.

16 Claims, 12 Drawing Sheets

HANDLING SYSTEM FOR A PLASTIC MATERIAL INJECTION MOLDING MACHINE

FIELD OF THE INVENTION

The present invention, generally, is related to the field of plastic material injection molding.

More specifically, the invention is related to a handling system for a plastic material injection molding machine comprising an arm for unloading plastic material articles from hollow cavities of a mold of the plastic material injection molding machine, wherein the hollow cavities are arranged in a first plane and the arm essentially moves within the first plane, a conveyor system moving within a second plane for transporting away the plastic material articles, and a transfer station arranged between the mold and the conveyor system for transferring the unloaded plastic material articles from the first plane to the second plane, the transfer station comprising a transfer plate for the plastic material articles and adapted to be moved along a predetermined trajectory from a first operational position within the first plane into a second operational position within the second plane.

BACKGROUND OF THE INVENTION

A handling system of the afore-mentioned type is known in the art.

In conventional plastic material injection molding machines, the mold portions are displaced away from one another in a horizontal direction. For unloading the finished plastic material articles, an arm of a handling system is inserted into the gap between the two mold portions, wherein the trajectory of the arm conventionally extends under right angles relative to the trajectory of the mold portions. Gripper elements, for example suction heads, are arranged at the free end of the arm for unloading the finished injection-molded plastic material articles from the hollow cavities which now lie free. The handling system arm is then again retracted and transfers the articles to a transfer plate. The transfer plate is located outside the injection molding machine and has a receiving surface lying essentially in the same plane as the hollow cavities.

As the plastic materials have to be transported away there-after, it is conventional to utilize a conveyor belt running in a horizontal plane. In order to transfer the plastic material articles from the transfer plate onto the conveyor belt, the transfer plate is tilted about a horizontal axis in a forward direction so that the surface of the transfer plate that had been in a vertical orientation and had carried the plastic material articles is now tilted by 90° downwardly so that the plastic material articles may now be transferred onto the conveyor belt.

The prior art handling system, hence, has the disadvantage that the transfer plate must be pivoted into an area where the arm is located. Therefore, the arm must first be displaced away out of the pivotal area of the transfer plate. This requires additional time so that the cycle time of the injection molding machine is increased.

It is, therefore, an object underlying the invention to improve a handling system of the type specified at the outset so that the afore-mentioned disadvantages are avoided. In particular, it shall become possible to effect the transfer from the transfer plate onto the conveyor belt such that it is not or almost not necessary to displace the arm before. By doing so, the cycle time may be reduced as compared with prior art handling systems and, hence, the productivity of the injection molding machine may be increased.

SUMMARY OF THE INVENTION

In a handling system of the type specified at the outset, this object is achieved in that the trajectory extends essentially outside the first plane.

The object underlying the invention is thus entirely solved because the trajectory of the transfer plate is positioned such that no collision with the arm is to be expected when the latter is in its retracted position in which the gripper elements on the arm are still in the position in which the plastic material articles had been transferred to the transfer plate. For, the plastic material articles are removed by the arm out of the hollow cavities in one direction and the trajectory of the transfer plate extends essentially in the opposite direction.

Considering that a separate displacement of the arm is no more necessary, in particular over relatively long distances as is the case in the prior art with relatively large transfer plates, the handling process is shortened which results in a reduction of the cycle time of the injection molding machine.

It is, therefore, possible to utilize the invention advantageously in connection with handling systems in which the first plane extends essentially vertically and, preferably, the second plane extends essentially horizontally, as known per se. Moreover, the invention may be utilized advantageously when the conveyor system comprises a conveyor belt.

If, according to another embodiment of the invention, the plastic material articles are arranged as groups within the first plane and are transferred in groups, the invention has further advantages. Namely, as has already been mentioned, in particular in connection with very large groups of plastic material articles and a corresponding plurality of hollow cavities within the mold, a correspondingly large transfer plate must also be provided. When the latter is pivoted in a conventional manner, the arm of the handling system must be driven far away in order to avoid collisions with the pivoted or tilted transfer plate.

In preferred embodiments of the invention, a transfer plate with a first rim thereof is arranged within the area of the second plane and, during the movement from the first into the second operational position, with its first rim is moved parallel to the second plane in a direction away from the first plane.

This measure has the advantage that the transfer plate ducks away downwardly and away from the first plane so that by means of this trajectory it is displaced on the one hand from the first into the second plane, i.e. preferably from its vertical into a horizontal position, on the other hand the trajectory of the arm is not intersected or only to a very small amount.

In connection with the afore-mentioned two embodiments, it is further preferred when the transfer plate is provided with a second rim opposite the first rim and the second rim, during the transition between the first and the second operational position, is guided essentially along the first plane.

This measure has the advantage to surely avoid that the transfer plate penetrates into the area of the first plane, i.e. into the trajectory of the arm, or, at least, that such penetration is reduced to an acceptable extent. Considering that according to this embodiment two opposite rims of the transfer plate are guided mechanically, another already mentioned advantage is that the plate is securely guided and there is no risk of canting same.

According to a modification of this embodiment, this trajectory may be realized in an advantageous manner in that the transfer plate is provided with a slide bearing in the area of the first rim, the slide bearing being adapted to be displaced along a slide rail extending parallel to the second plane.

This measure has the advantage that the afore-mentioned trajectory may be guaranteed and that the transfer plate during that movement is securely guided on its lower rim. A canting of the transfer plate during that sequence of movements is impossible.

In an additional or an alternative modification of the afore-mentioned embodiment, the transfer plate is only or also provided with a slide bearing in the area of the second rim, the slide bearing being adapted to be displaced along a slide rail extending parallel to the first plane.

In a first alternative thereto, the transfer plate, instead, is provided with a joint in the area of the first rim, the joint being adapted to displace along a circular trajectory of large radius extending essentially tangential to the second plane.

Correspondingly, in an inverted manner according to a second alternative the transfer plate may be provided with a joint in the area of the second rim, the joint being adapted to be displaced along a circular trajectory of large radius extending essentially tangential to the first plane.

In all these cases, a secure guide of the rims in the area of the first and of the second plane, respectively, is achieved. A precise longitudinal guide may then be achieved within the first and/or within the second plane by means of the guide rails. In the other case, this longitudinal guide is approximated by an arc of large radius. This alternative may be designed mechanically simpler, according to the specific situation.

According to further embodiments of the invention, the transfer plate is adapted to be moved between the first and the second operational positions by means of a rocker, wherein the rocker has a swivel point or joint arranged outside the transfer plate at least during a portion of the sequence of movements, a servo-mechanical actuator being provided engaging the swivel point or joint.

This measure has the advantage that the entire sequence of movements may be effected by one single actuator without the necessity of utilizing a plurality of drives.

Insofar it is particularly preferred when the actuator is arranged in the area of the second plane, preferably below the second plane.

These measures have several essential advantages. On the one hand, a drive located at the bottom results in a smaller vertical dimension of the handling system. Moreover, it is particularly preferred in connection with applications under clean room conditions when any drive elements are located within the lower portion of the installation. This is because clean rooms conventionally utilize a special air flow system, namely a so-called laminar flow system, in which the air flows from the ceiling downwardly to the floor of the room in order to dispose of any particles within the room. If in such a situation drive elements are positioned above the conveyor, it may happen that particles are generated through abrasion within the drive which are then taken along by the laminar flow and may, hence, deposit on the conveyed articles. This will be avoided when the drive elements are located below the conveyor or at least within the same vertical position as the conveyor. Moreover, when the drive elements are located at a low position, a mechanically more stable construction of the installation may be achieved and, simultaneously, a better access to the drive elements.

The advantages specified before of course hold also true in case that the drive elements for the arm of the handling system are also positioned below the conveyor.

It should further be mentioned at this instance that the afore-explained considerations of course also apply for a case in which, in an inverted manner compared to what was described before, articles are taken away from a conveyor belt and, by means of a handling system, are inserted into hollow cavities of the mold. Such a situation prevails, for example, when the plastic material articles shall be provided with certain inserts or parts, for example with reinforcing elements, pins, hinges or the like or, in the case of the production of socalled "smart cards" with electronic circuits, antennas or similar elements. In that situation, the sequence of movements is just inverted as compared to what was described above, however, the described advantages are the same.

The actuator is preferably configured as a piston-and-cylinder unit, however, it goes without saying that also other actuators may be used, for example motorized actuators.

For what concerns the points of engagement of the actuator, two alternatives are encompassed by the invention.

In a first alternative, the actuator is linked to a stationary swivel point.

This measure has the advantage that a simple construction is achieved. However, the actuator must effect a relatively large stroke of displacement so that it might be necessary under certain circumstances, when a piston-and-cylinder unit is used, to select a telescope cylinder.

In an alternative, however, in which the transfer plate on at least one rim thereof is guided within a slide rail extending parallel to one of the planes by means of a slide bearing and the slide rail is adapted to be displaced parallel to the plane, the actuator may be linked to the displaceable guide rail.

This measure has the advantage that during the extension and the retraction of the actuator the slide rail being longitudinally movable is also displaced so that a complex sequence of movements is generated which, however, has the advantage that it requires only a limited space. Therefore, the handling system only requires a small space within the installation and the actuator itself needs only to effect a relatively small stroke. When a piston-and-cylinder unit is used, it is sufficient to use a simple piston and no telescope cylinder at all.

Further advantages will become apparent from the description and the enclosed drawing.

It goes without saying that the features mentioned before and those that will be explained hereinafter may not only be used in the particularly given combination but also in other combinations or alone without leaving the scope of the present invention.

BRIEF DESCRIPTION OF THE DRAWINGS

Embodiments of the invention are shown in the drawing and will be described in the subsequent description.

DETAILED DESCRIPTION OF THE PREFERRED EMBODIMENTS

Figure 1A:
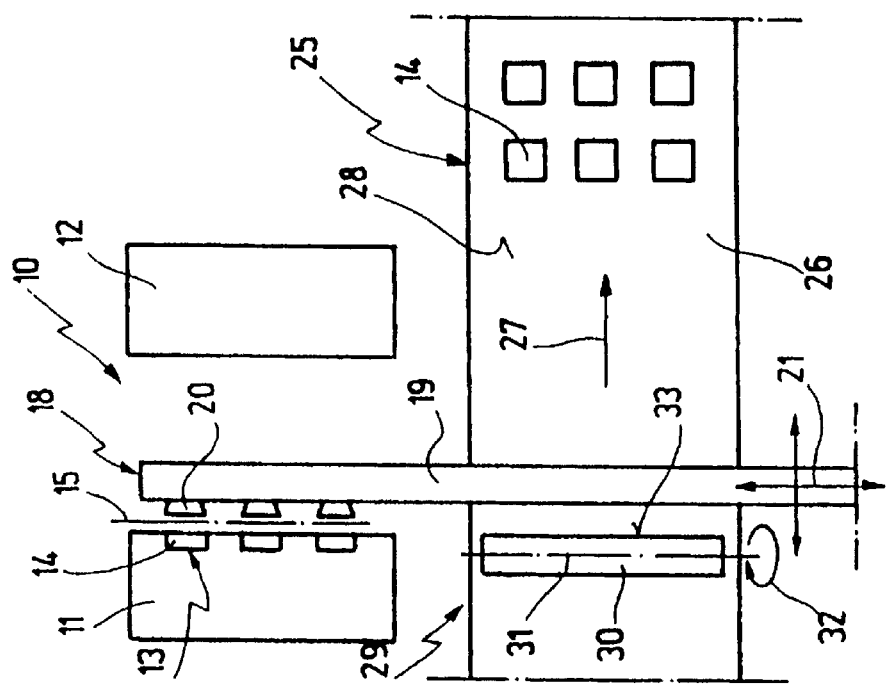
FIGS. 1A–1D show a handling system of the prior art in four distinct operational positions.

In the top plan views of FIGS. 1A through 1D, reference numeral 10 as a whole indicates a plastic material injection molding machine according to the prior art.

Machine 10 comprises a first mold portion 11 and a second mold portion 12. First mold portion 11 is provided with hollow cavities 13. In the initial situation of FIG. 1a, finished injection-molded plastic material articles 14 are positioned within hollow cavities 13.

As has already been mentioned, FIG. 1A is a top plan view. Therefore, one can only see hollow cavities 13 in a row. However, hollow cavities 13 define a first plane 15 so that several rows of hollow cavities 13 are positioned one above another so that the hollow cavities 13 configure a raster of, for example, 3×4=12 hollow cavities. This is, of course, only to be understood as an example.

It shall, further, be indicated that the plastic material injection molding machine 10 shown in FIGS. 1A through 1D having a mold with two mold portions 11 and 12 is also to be understood only as an example. The invention, may of course, also be utilized in connection with other types of such machines, for example when these machines are equipped with a stack mold or other types of mold.

Reference numeral 18 designates a handling system. Handling system 18 comprises a gripper arm 19 being equipped with grippers 20, for example with suction heads, at its free terminal end. Gripper arm 19 is adapted to be displaced along several directions by means of appropriate drives, as indicated in FIG. 1A with a coordinate system 21.

A conveyor system, indicated as a whole by reference numeral 25, is located on a lateral side of a plastic material injection molding machine 10. Conveyor system 25 comprises a conveyor belt 26 that may be displaced in the direction of an arrow 27. Hence, conveyor belt 26 defines a second plane 28.

In the embodiment shown, first plane 15 with hollow cavities 13 extends vertically, whereas second plane 28 of conveyor belt 26 extends horizontally. It is, therefore, necessary to transfer plastic material articles 14 after unloading them from hollow cavities 13, from the vertical first plane 15 into horizontal second plane 28.

For that purpose, a transfer station is provided indicated at 29. In the embodiment shown, transfer station 29 comprises a transfer plate 30 which, too, is essentially arranged within first plane 15. Transfer plate 30 is adapted to be tilted or pivoted about a horizontal axis 31 at its bottom, as will be explained in further detail below. This is indicated by an arrow 32.

Transfer plate 30 has a front surface 33 lying within first plane 15.

In the initial position of FIG. 1A, arm 19 is in its extended position in which its grippers 20 face hollow cavities 13 for unloading plastic material articles 14.

Figure 1B:
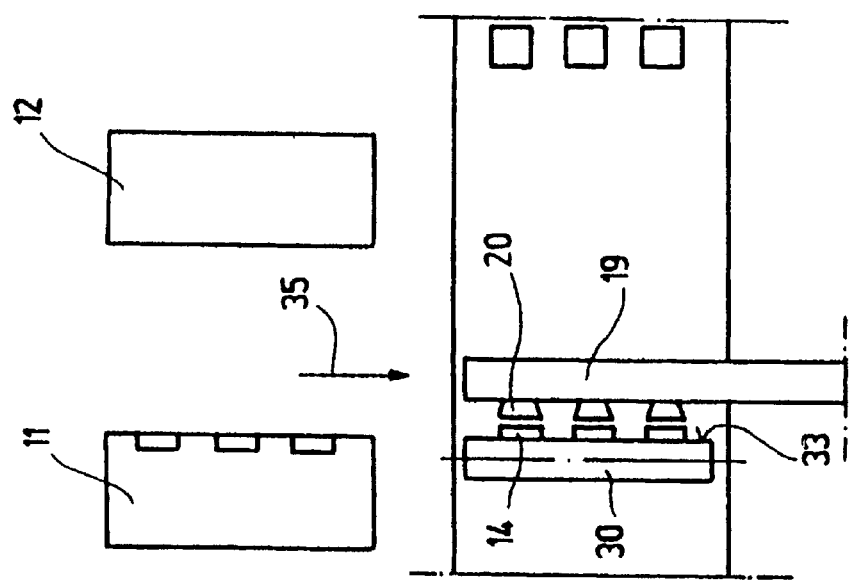

As indicated by an arrow 35 in FIG. 1B, arm 19 is then retracted until grippers 20 face surface 33 of transfer plate 30. Plastic material articles 14 are now transferred onto surface 33.

Figure 1C:
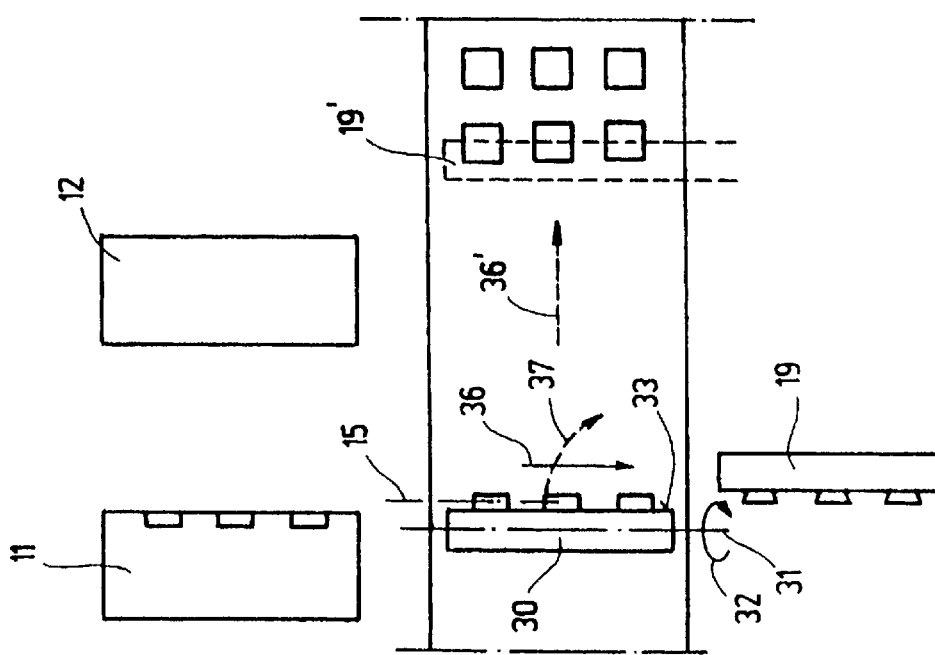

In this prior art handling system 18, arm 19 must now be displaced according to FIG. 1C in the direction of an arrow 36 until in the top plan view of FIG. 1C it is in a position below transfer plate 30. As an alternative, arm 19 could also be displaced to the right hand side as indicated in FIG. 1C by dashed lines and by an arrow 36'. Arm 19' in that case is displaced along the direction (arrow 27) of conveyor belt 26.

This movement of arm 19 or 19', respectively, is necessary because transfer plate 30 is now tilted about its pivot axis 31 to the right hand side as indicated by a trajectory 37. Transfer plate 30 that had assumed an upright vertical position before now lies on conveyor belt 26 with its surface 33 facing downwardly, as one may clearly see from FIG. 1D. One will also appreciate from FIG. 1D the raster of plastic material articles 14 corresponding to the raster of hollow cavities 13 within first mold portion 11.

Figure 1D:
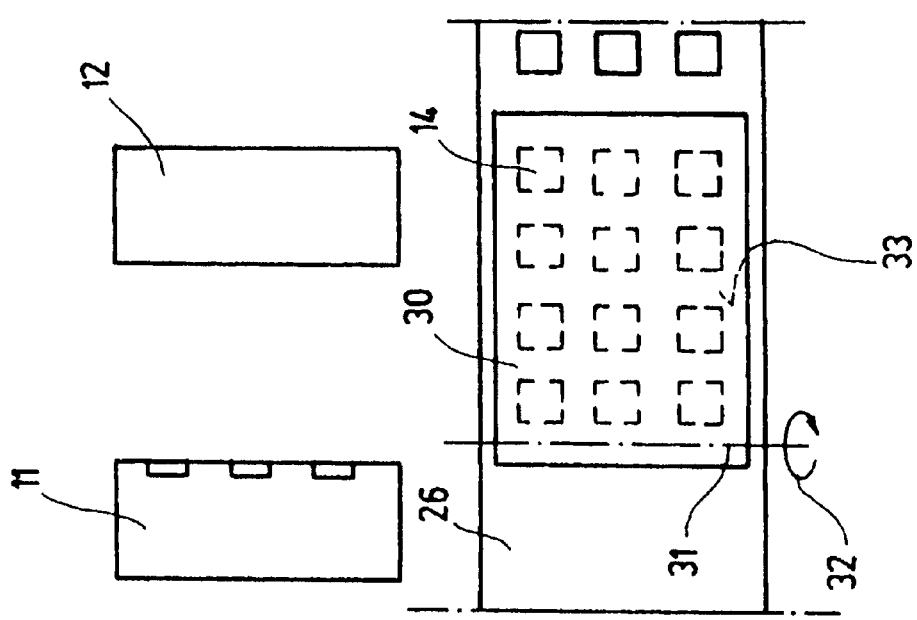

In the operational position of FIG. 1D, plastic material articles 14 are now transferred from transfer plate 30 onto conveyor belt 26 by, for example, releasing holding elements on the transfer plate 30, whereby plastic material articles 14 will now fall onto conveyor belt 26 under the action of gravity and will remain there when transfer plate 30 is then again tilted back upwardly about its pivot axis 31.

It will be easily appreciated that the displacement of arm 19 or 19' from the operational position of FIG. 1B into the operational position of FIG. 1C and back again at a later moment in time requires some time, making the transfer operation and also the cycle time of plastic material injection molding machine 10 longer.

Figure 2A:
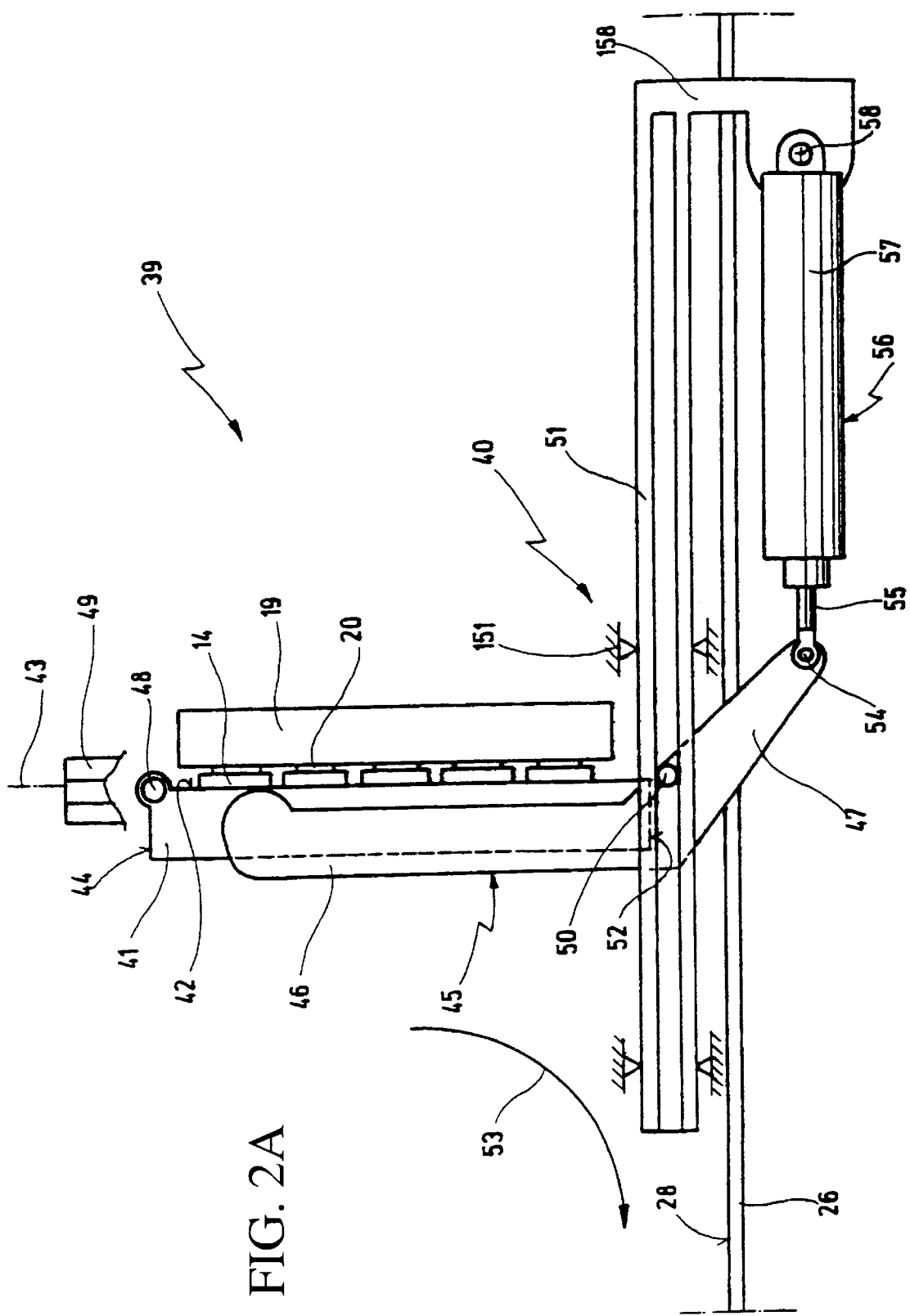
FIGS. 2A–2C show a first embodiment of a handling system according to the present invention, in three distinct operational positions.
Figure 2B:
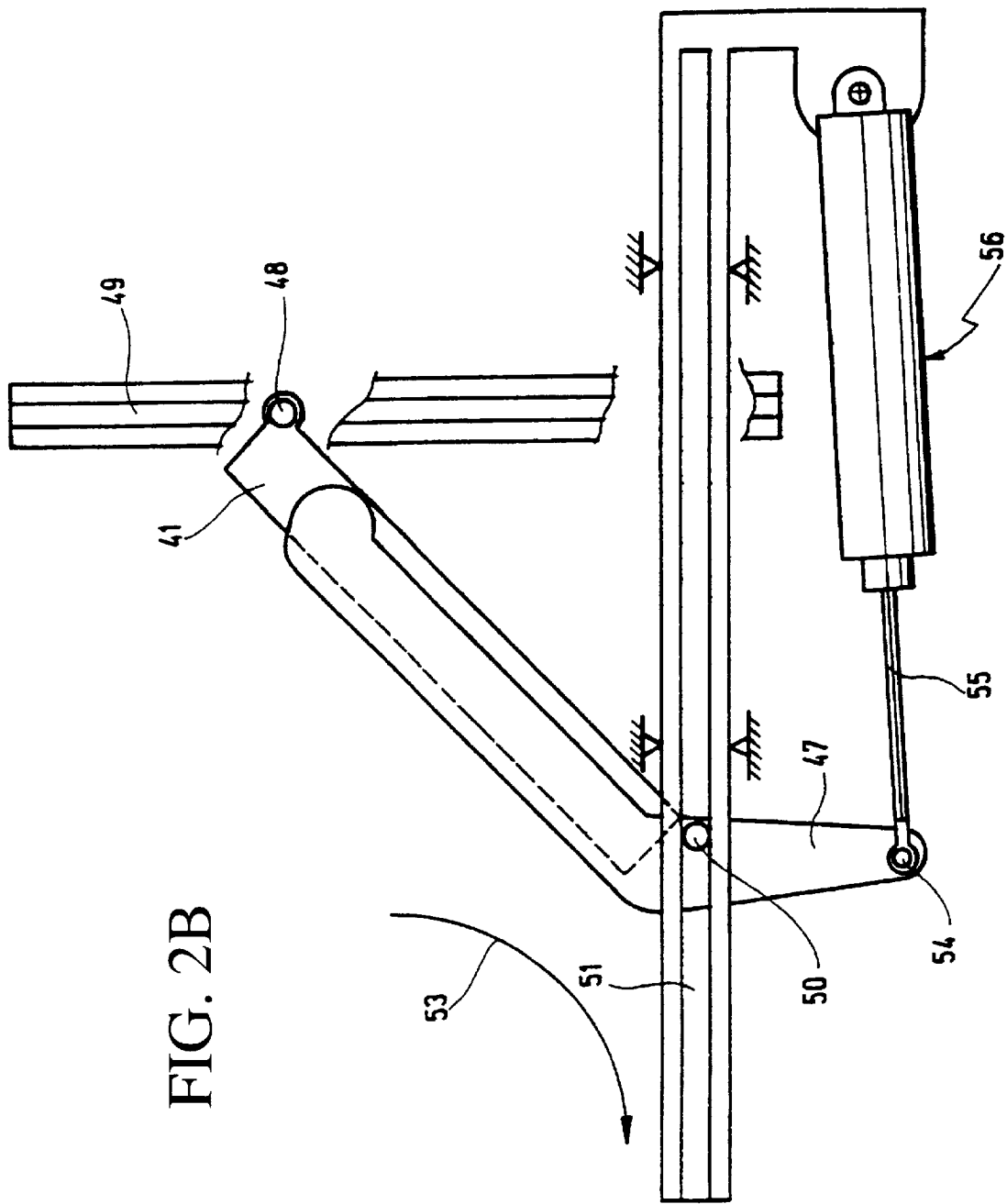
Figure 2C:
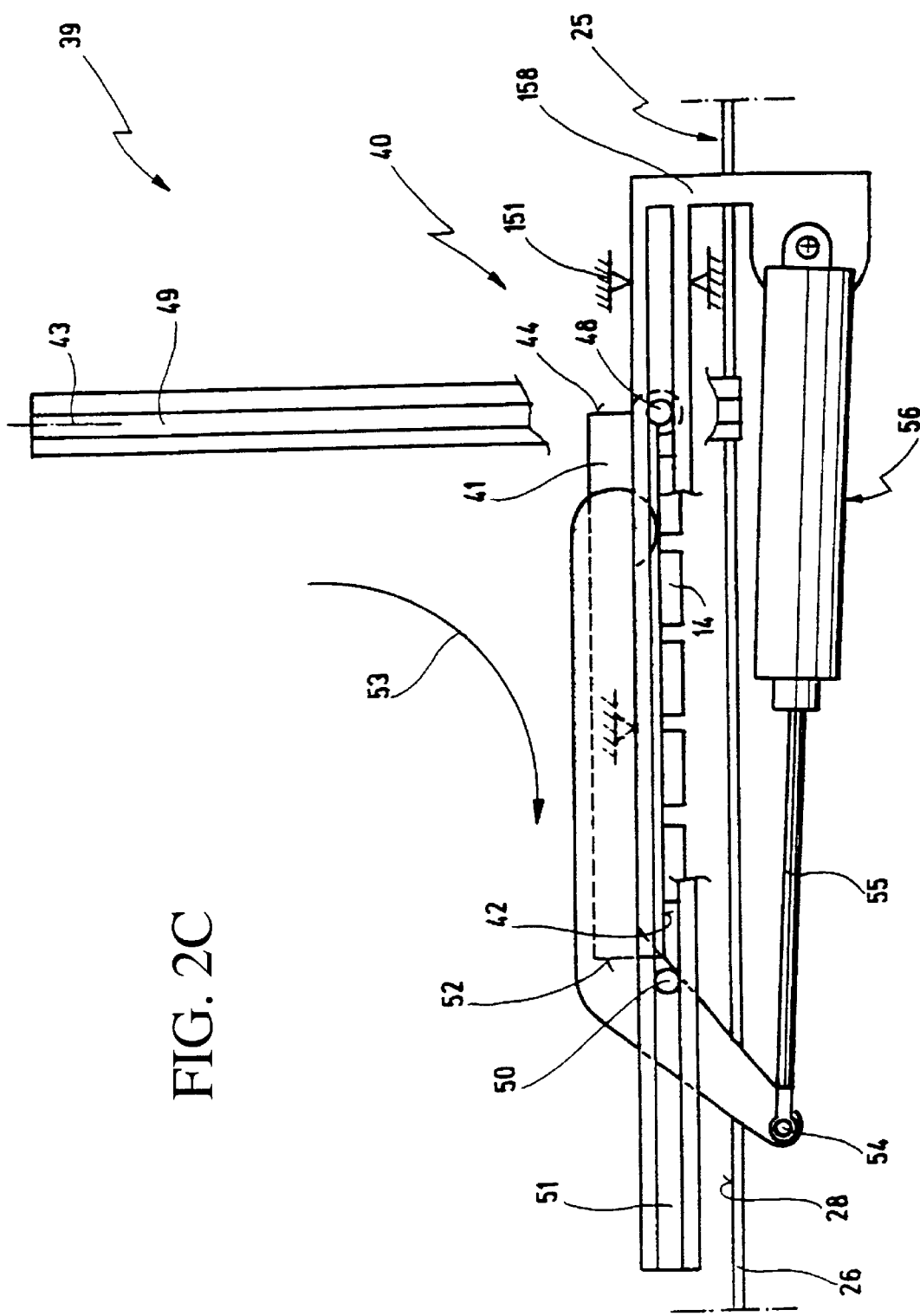

In FIGS. 2A through 2C, a first embodiment of a handling system 39 according to the invention is shown in three phases of movement. FIGS. 2A through 2C are side elevational views.

One can see a transfer station designated at 40 having again a transfer plate 41. In the initial position of FIG. 2A, transfer plate 41 extends vertically and upwardly. On its front side it has a surface 42 for plastic material articles 14. In such a way, a first plane 43 is defined which, again, coincides with the plane of the hollow cavities (not shown) and also coincides with the direction of displacement of arm 19 (cf. FIG. 1A and FIG. 1B).

A first upper rim of transfer plate 41 is designated at 44.

A rocker 45 engages transfer plate 41. Rocker 45 comprises a section 46 engaging transfer plate 41 laterally and being rigidly connected thereto. A free arm 47 of rocker 45 protrudes to the right hand side and downwardly from transfer plate 41 in the position of FIG. 2A.

In the upper left corner of transfer plate 41 in FIG. 2A, i.e. above the upper end of section 46 of rocker 45, and at the right hand side end of first rim 44, respectively, there is a first slide bearing 48. First slide bearing 48 runs in a first slide rail 49 indicated only schematically and extending vertically, i.e. parallel to first plane 43, preferably in its immediate vicinity or coinciding with same.

A second slide bearing 50 is provided at the lower end of section 46 of rocker 45. Second slide bearing 50 runs in a second slide rail 51 also shown only schematically. Second slide rail 51 extends in a horizontal direction and in the immediate vicinity of a second, lower rim 52 of transfer plate 41. Second slide rail 51, in turn, is adapted to be displaced within stationary bearings 151 in a horizontal direction, i.e. parallel to second plane 28 defined by conveyor belt 26.

In order to change the position of transfer plate 41 from the first vertical operational position shown in FIG. 2A to a second horizontal operational position shown in FIG. 2C, a sequence of moments is provided as indicated by a trajectory 53.

For executing trajectory 53, a piston rod 55 of a piston-and-cylinder unit 56 is linked to a first swivel point or joint at the free end of free arm 47 of rocker 45. The cylinder 57 of piston-and-cylinder unit 56 is linked to a second swivel point 58.

Second swivel point 58 is rigidly connected with second slide rail 51 via a flange 158 and, hence, will be displaced in a horizontal direction together with same.

As one will easily appreciate from the subsequent illustrations of phases of movement according to FIGS. 2A, 2B and 2C, advancing or extending the piston or its associated piston rod 55 will effect that second slide bearing 50 moves along second slide rail 51 to the left hand side and, simultaneously, first slide bearing 48 moves along first slide rail 49 downwardly. Due to the rigid connection between second slide rail 51 and second swivel point 58 via flange 158, second slide rail 51 and piston-and-cylinder unit 56 are also displaced to the left hand side. Due to this complex sequence of movements, the entire space required is relatively small and the movement of piston rod 55 is likewise limited to a relatively small value, such that a piston-and-cylinder unit with only one piston rod 55 may be used.

As first slide bearing 48 is arranged at the right upper corner of transfer plate 41, first rim 44 does not penetrate into the area of first plane 43.

In the second operational position of FIG. 2C, surface 42 of transfer plate 41 is directed downwardly so that plastic material articles 14 may be transferred therefrom onto conveyor belt 26 without problems.

During the sequence of movements according to FIGS. 2A through 2C, the area on the right hand side of first plane 43 remains untouched, as mentioned, so that arm 19 being in that position (cf. FIG. 2A) may remain in that position or must just be moved away by a very little amount. Therefore, not much time is lost.

One may, further, take from FIGS. 2A through 2C that the drive elements for transfer station 40, i.e. piston-and-cylinder unit 46, are located below conveyor belt 26 so that the space above conveyor belt 26 is free from any such elements.

Figure 3:
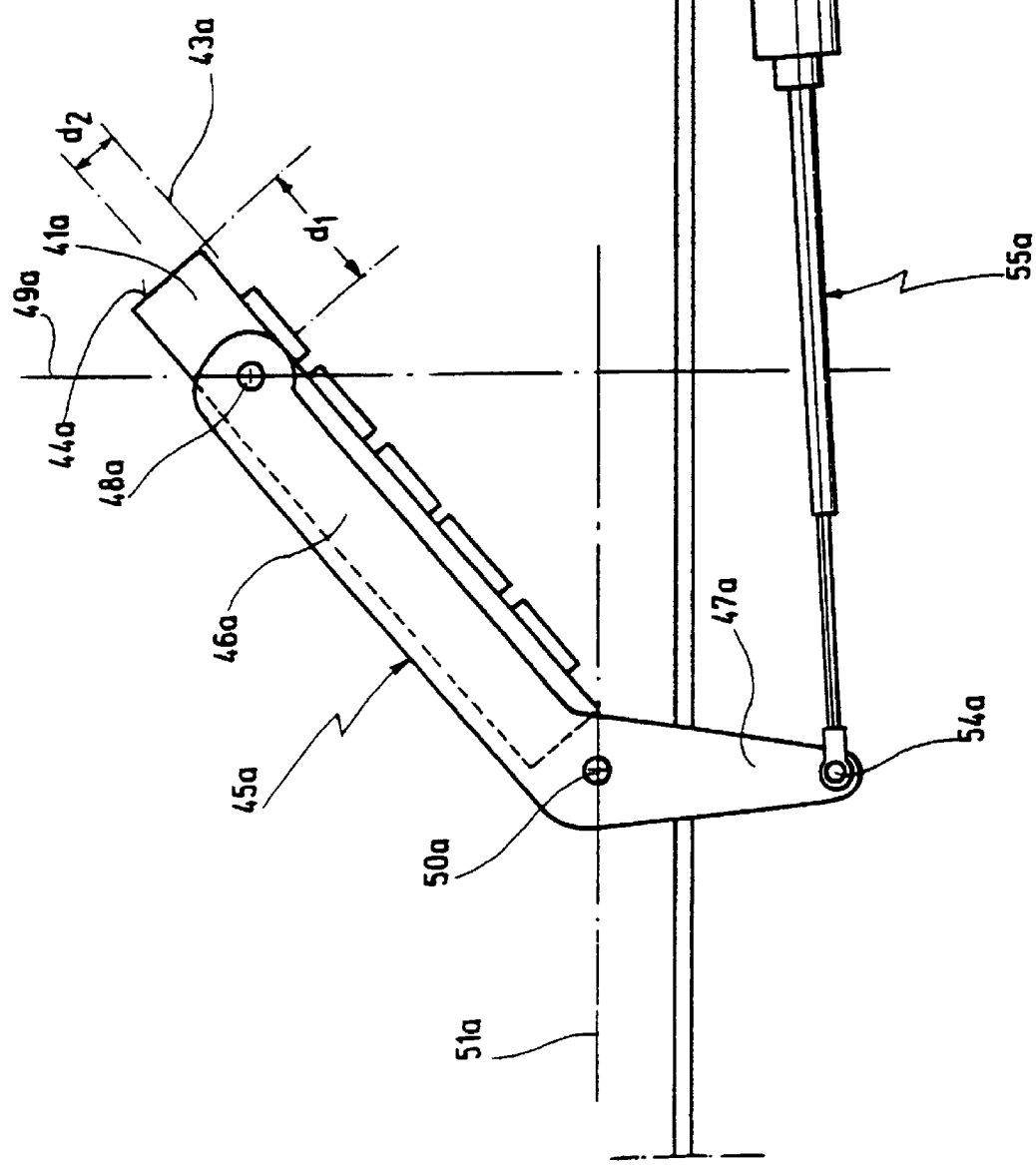
FIG. 3 shows a second embodiment of a handling system according to the present invention in an operational position similar to that of FIG. 2B.

FIG. 3 shows a variation of the embodiment shown in FIGS. 2A through 2C, wherein the illustration of FIG. 3 essentially corresponds to the illustration of FIG. 2B. Like elements are, therefore, designated with like numerals and only an "a" was added for the sake of better differentiation.

The embodiment of FIG. 3 distinguishes from that of FIG. 2B essentially in two aspects:

First, for the embodiment of FIG. 3 an arrangement was selected in which first slide bearing 48a is not located in the right upper corner of transfer plate 41a but at the upper end of section 46a of rocker 45a instead. First slide bearing 48a, therefore, is at a distance $d_1$ from upper first rim 44a. Further, first slide bearing 48a is set back by a distance $d_2$ from first plane 43a.

This particular design is somewhat simpler to execute in some applications, however, has the disadvantage as compared to the above-described embodiment of FIGS. 2A through 2C that first rim 44a somewhat extends into the area on the opposite side of first plane 43a in the initial position (corresponding essentially to the position of first slide rail 49a in FIG. 3).

The second distinction consists in that in the embodiment of FIG. 3, piston-and-cylinder unit 56a is linked to a stationary second swivel point 58a on its right hand side end in FIG. 3. Second slide rail 51a being indicated in FIG. 3 only by a dash-dot line may, hence, also be stationary so that stationary bearings 151 of the embodiment shown in FIGS. 2A through 2C are not required at this instance.

However, the embodiment of FIG. 3 requires a larger space because the right hand side end of piston-and-cylinder unit 56a remains fixed to stationary second swivel point 58a and will not be displaced together with a movable slide rail to the left hand side when transfer plate 41 is displaced through its trajectory.

Considering that in this case first swivel point 54a in comparison to the embodiment of FIGS. 2A through 2C must also be moved along a substantially longer path (relative to stationary second swivel point 58a), the embodiment of FIG. 3 would require to utilize a piston-and-cylinder unit 56a provided with a telescope 55a.

The advantage of the design of second slide rail 51a in the embodiment of FIG. 3 is, hence, compensated by a certain design complexity in the area of piston-and-cylinder unit 56a as well by a somewhat larger required space.

Figure 4A:
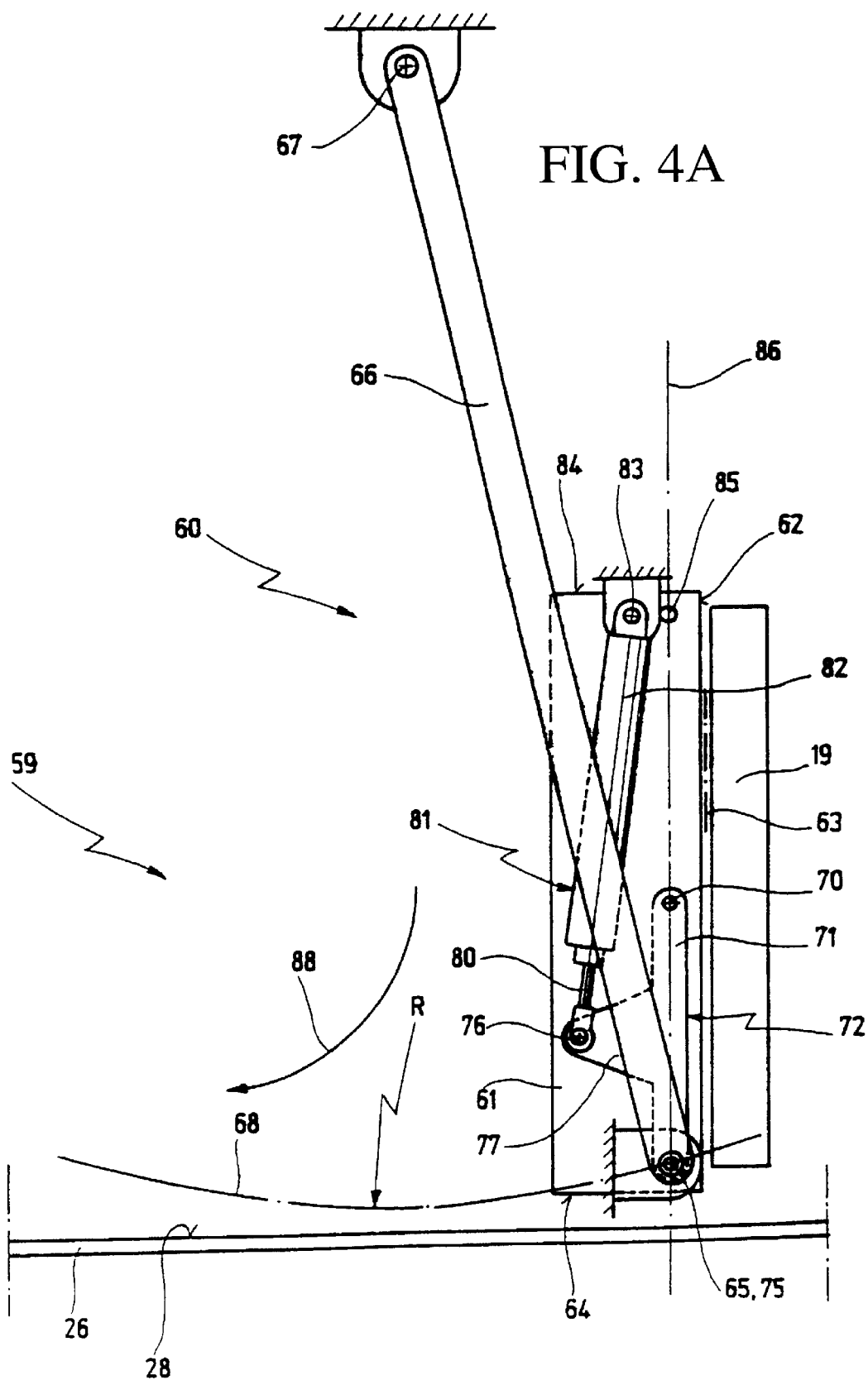
FIGS. 4A–4C show a third embodiment of a handling system according to the present invention, in three distinct operational positions.
Figure 4B:
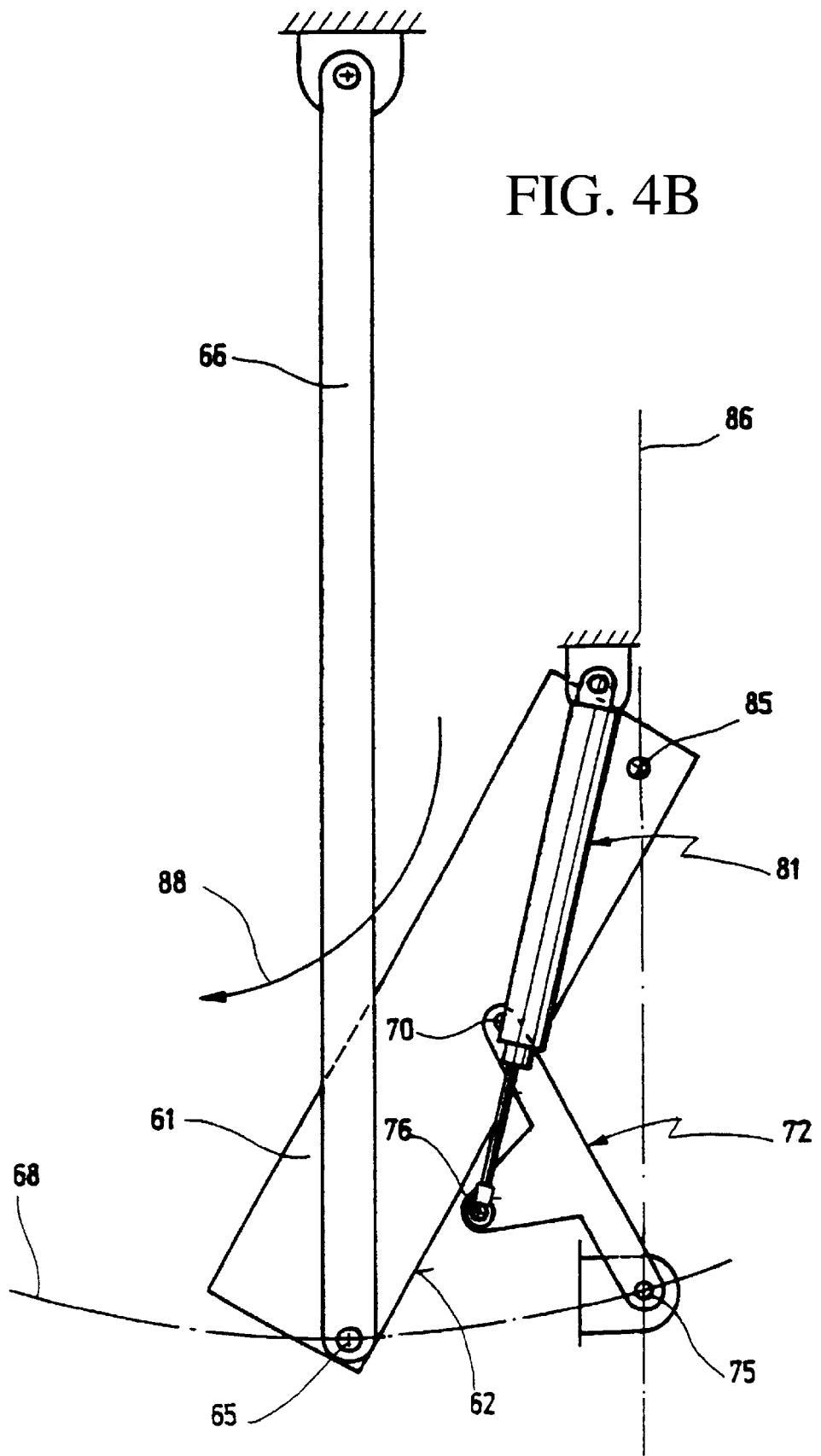
Figure 4C:
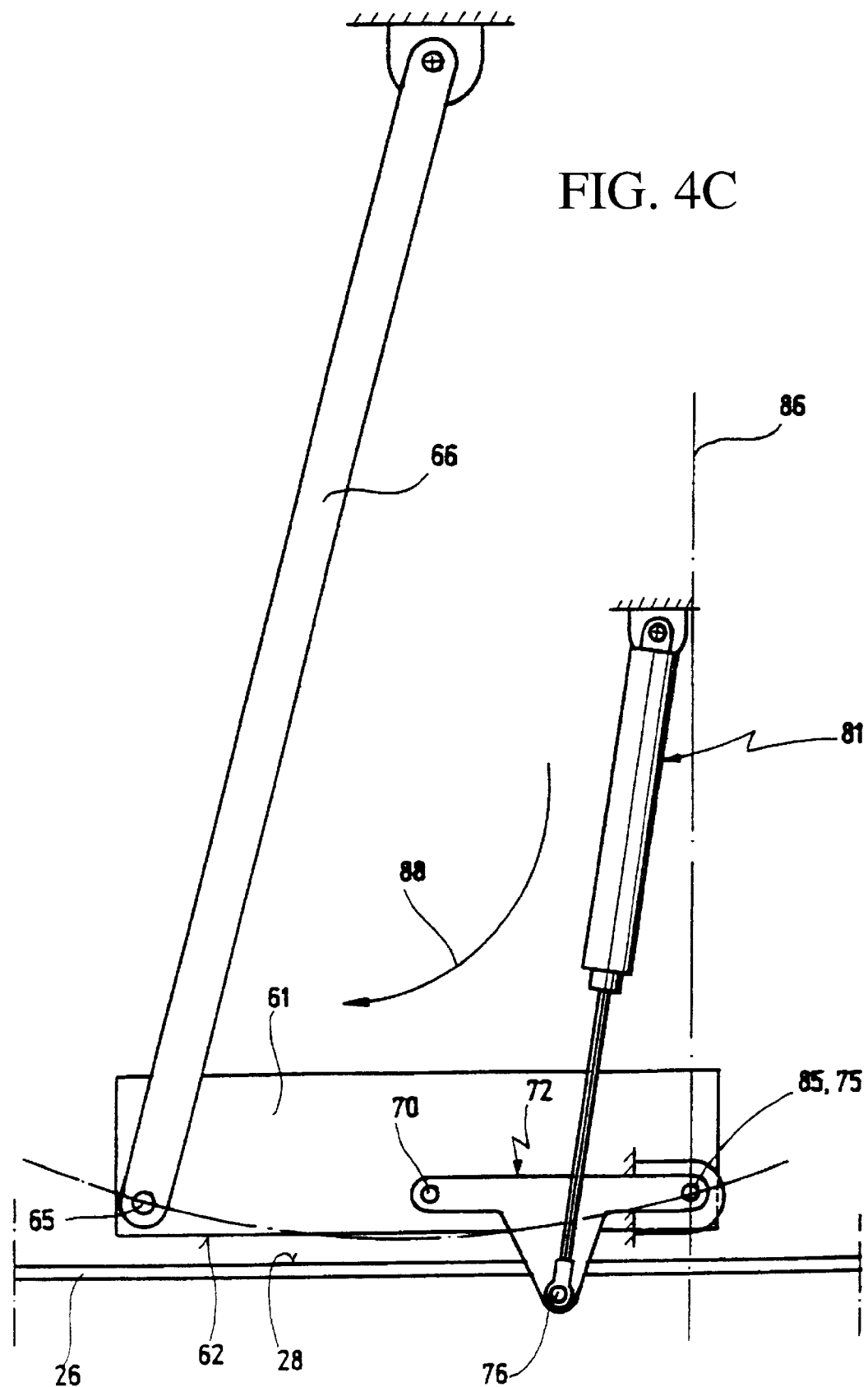

FIGS. 4A through 4C show a second embodiment of a handling system 59 according to the present invention and having a transfer station 60. The view is the same as that in FIGS. 2A through 2C.

Transfer station 60, too, comprises a transfer plate 61 having a surface 62 for receiving the plastic material articles (not shown). Surface 62, again, defines a first plane 63.

Transfer plate 61 has a first rim 64 being the lower rim in FIG. 1A. In the vicinity of lower rim 64, there is a first swivel point 65 of transfer plate 61. A first rocker 66 interconnects first swivel point 65 with a second, stationary swivel point 67. First rocker 66 has a great length as compared to the dimensions of transfer plate 61 so that first swivel point 65 describes a circular trajectory 68 with large radius R during the tilting of first rocker 66.

A third swivel point 70 is located approximately in the center of transfer plate 61. A second, two-armed rocker 72 engages third swivel point 70 with a first arm 71. Second rocker 72 is linked to a fourth, stationary swivel point 75. A piston 80 or a piston rod, respectively, of a piston-and-cylinder unit 81 engages a fifth swivel point 76 at the free end of a second arm 77 of second rocker 72. Cylinder 82 of piston-and-cylinder unit 81 is adapted to be pivoted about a sixth, stationary swivel point 82.

A second rim of transfer plate 61 being the upper rim in FIG. 4A, is designated at 84. A slide bearing 85 is provided at transfer plate 61 in the vicinity of second rim 84. It goes without saying that slide bearing 85 should be located as much as possible in the right upper corner of transfer plate 41 in FIG. 4A (cf. first slide bearing 48 in FIG. 2A). Slide bearing 85 may be displaced along a slide rail 86 indicated only schematically. Slide rail 86 extends vertically and, hence, under right angles relative to second plane 28 defined by conveyor belt 26.

In the operational position of FIG. 4A, first swivel point 65 and fourth, stationary swivel point 75 coincide in the side elevational view.

FIG. 4A shows a first, vertical operational position of transfer plate 61, whereas FIG. 4C shows a second, horizontal operational position. The transfer plate shall now be moved along a trajectory indicated at 88, while second rim 84 shall not or only to a very small amount intersect with first plane 63.

This is effected according to the sequence of movements shown because first swivel point 65 located in the right lower corner of transfer plate 61 in the depiction of FIG. 3A is guided along circular trajectory 68 of large radius R extending on the left hand side of first plane 63.

When piston rod 80 of piston-and-cylinder unit 81 is advanced from the position shown in FIG. 4A, second rocker 72 is pivoted about fourth, stationary swivel point 75 in a counterclockwise direction so that third swivel point 70 in the center of transfer plate 61 will also effect a quarter of a circle in a counterclockwise direction. Thereby slide bearing 85 is displaced from above in a downward direction along slide rail 86 and, simultaneously, the right lower corner of transfer plate 61 is pivoted from the first operational position of FIG. 4A along circular trajectory 68 to the left hand side. Via an intermediate position as shown in FIG. 4B, transfer plate 61, hence, comes into its final position shown in FIG. 4C. In that position, surface 62, as desired, shows downwardly so that the plastic material articles held thereon may now be transferred to the conveyor belt running thereunder (not shown).

Figure 5:
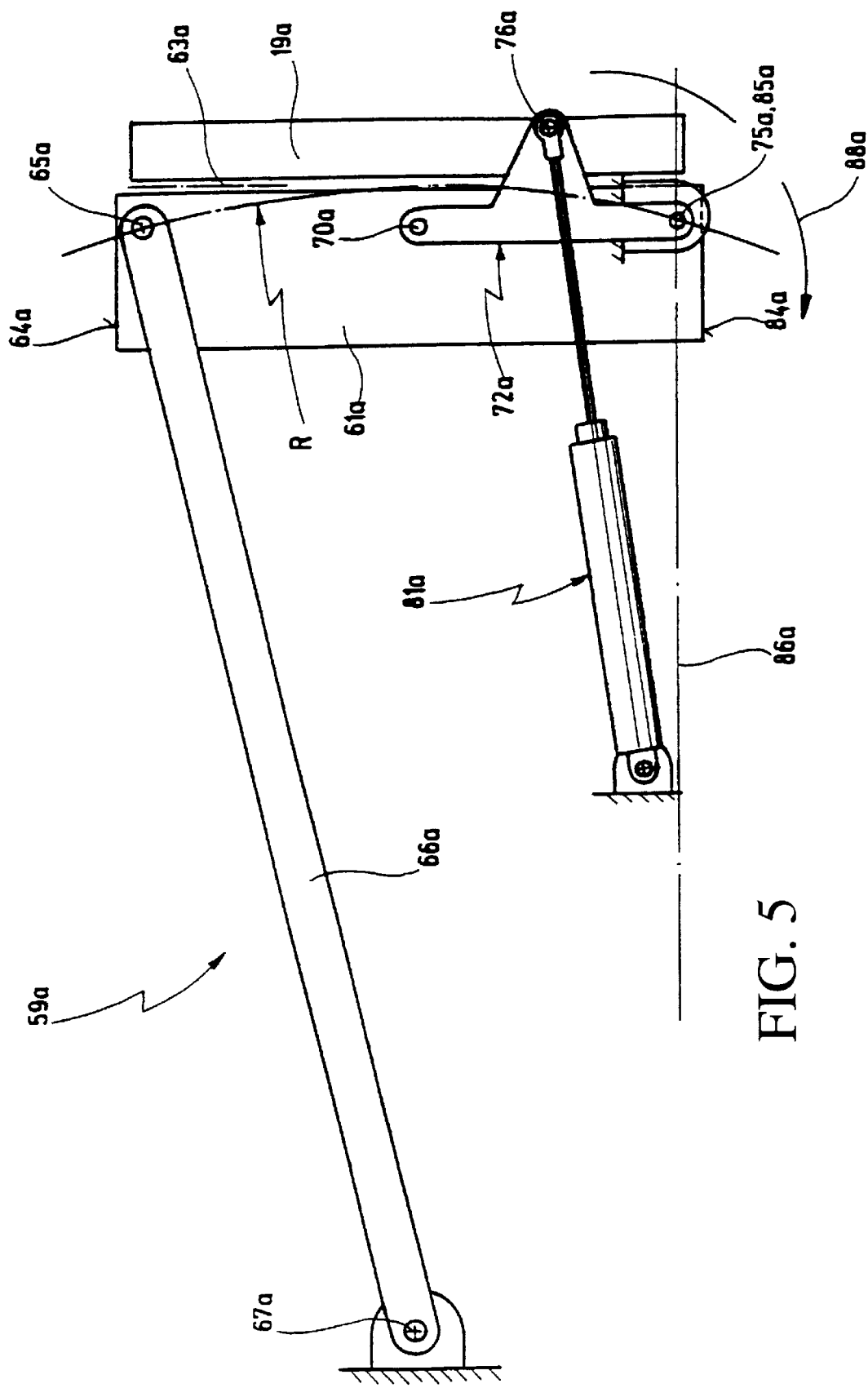
FIG. 5 shows a fourth embodiment of a handling system according to the present invention, similar to that of FIG. 4A.

FIG. 5 shows a variation of the embodiment of FIGS. 4A through 4C. Under design aspects, the embodiment of FIG. 4 is almost identical to the embodiment of FIGS. 4A through 4C, except that the orientation is rotated by 90° so that the final position of the embodiment of FIGS. 4A through 4C shown in FIG. 4C corresponds to the initial position of the embodiment of FIG. 5 (rotated by 90°). The sequence of movements is now effected in an inverted sequence. As a consequence, all elements in FIG. 5 are designated by identical reference numerals as in FIGS. 4A through 4C with the exception that for the sake of better differentiation an "a" is added.

Besides that, the sequence of movements of the embodiment of FIG. 5 is self-explanatory because the above description for the embodiment of FIGS. 4A through 4C may be used if only some terms like "counterclockwise" are changed into "clockwise" etc.

By the way, the same holds true for the embodiment of FIGS. 2A through 2C and the embodiment of FIG. 3, because these embodiments may, of course, be also used in an "inverted" arrangement in that the entire arrangement is rotated by 90°, whereby the final position shown in the afore-mentioned figures would then correspond to the initial position of such a modified embodiment.

What is claimed is:

1. A handling system for a plastic material injection molding machine comprising an arm for unloading plastic material articles from hollow cavities of a mold of said plastic material injection molding machine, wherein said hollow cavities are arranged in a first plane and said arm essentially moves within said first plane, a conveyor system moving within a second plane for transporting away said plastic material articles, and a transfer station arranged between said mold and said conveyor system for transferring said unloaded plastic material articles from said first plane to said second plane, said transfer station comprising a transfer plate for said plastic material articles and adapted to be moved along a predetermined trajectory from a first operational position within said first plane into a second operational position within said second plane, said trajectory extending essentially outside said first plane.

2. The handling system of claim 1, wherein said first plane extends essentially vertically.

3. The handling system of claim 1, wherein said second plane extends essentially horizontally.

4. The handling system of claim 3, wherein said conveyor system comprises a conveyor belt.

5. The handling system of claim 1, wherein said plastic material articles are arranged as groups within said first plane and are transferred in groups.

6. The handling system of claim 1, wherein said transfer plate with a first rim thereof is arranged within an area of said second plane and, during movement from said first into said second operational position, with said first rim is moved parallel to said second plane in a direction away from said first plane.

7. The handling system of claim 6, wherein said transfer plate is provided with a second rim opposite said first rim, said second rim during transition between said first and said second operational position being guided essentially along said first plane.

8. The handling system of claim 6, wherein said transfer plate is provided with a slide bearing in an area of said first rim, said slide bearing being adapted to be displaced along a slide rail extending parallel to said second plane.

9. The handling system of claim 7, wherein said transfer plate is provided with a slide bearing in an area of said second rim, said slide bearing being adapted to be displaced along a slide rail extending parallel to said first plane.

10. The handling system of claim 7, wherein said transfer plate is provided with a joint in an area of said first rim, said joint being adapted to be displaced along a circular trajectory of large radius extending essentially tangential to said second plane.

11. The handling system of claim 7, wherein said transfer plate is provided with a joint in an area of said second rim, said joint being adapted to be displaced along a circular trajectory of large radius extending essentially tangential to said first plane.

12. The handling system of claim 1, wherein said transfer plate is adapted to be moved between said first and said second operational positions by means of a rocker, said rocker having a swivel point arranged outside said transfer plate at least during a portion of a sequence of movements of said rocker, a servo-mechanical actuator engaging said swivel point.

13. The handling system of claim 12, wherein said actuator is arranged in an area of said second plane.

14. The handling system of claim 13, wherein said actuator is arranged below said second plane.

15. The handling system of claim 12, wherein said actuator is a piston-and-cylinder unit linked to a stationary swivel point.

16. The handling system of claim 12, wherein said transfer plate on at least one rim thereof is guided within a slide rail extending parallel to one of said first and second planes by means of a slide bearing, said slide rail being adapted to be displaced parallel to said plane, said actuator being a piston-and-cylinder unit linked to said displaceable guide rail.

* * * * *